Patented Sept. 3, 1946

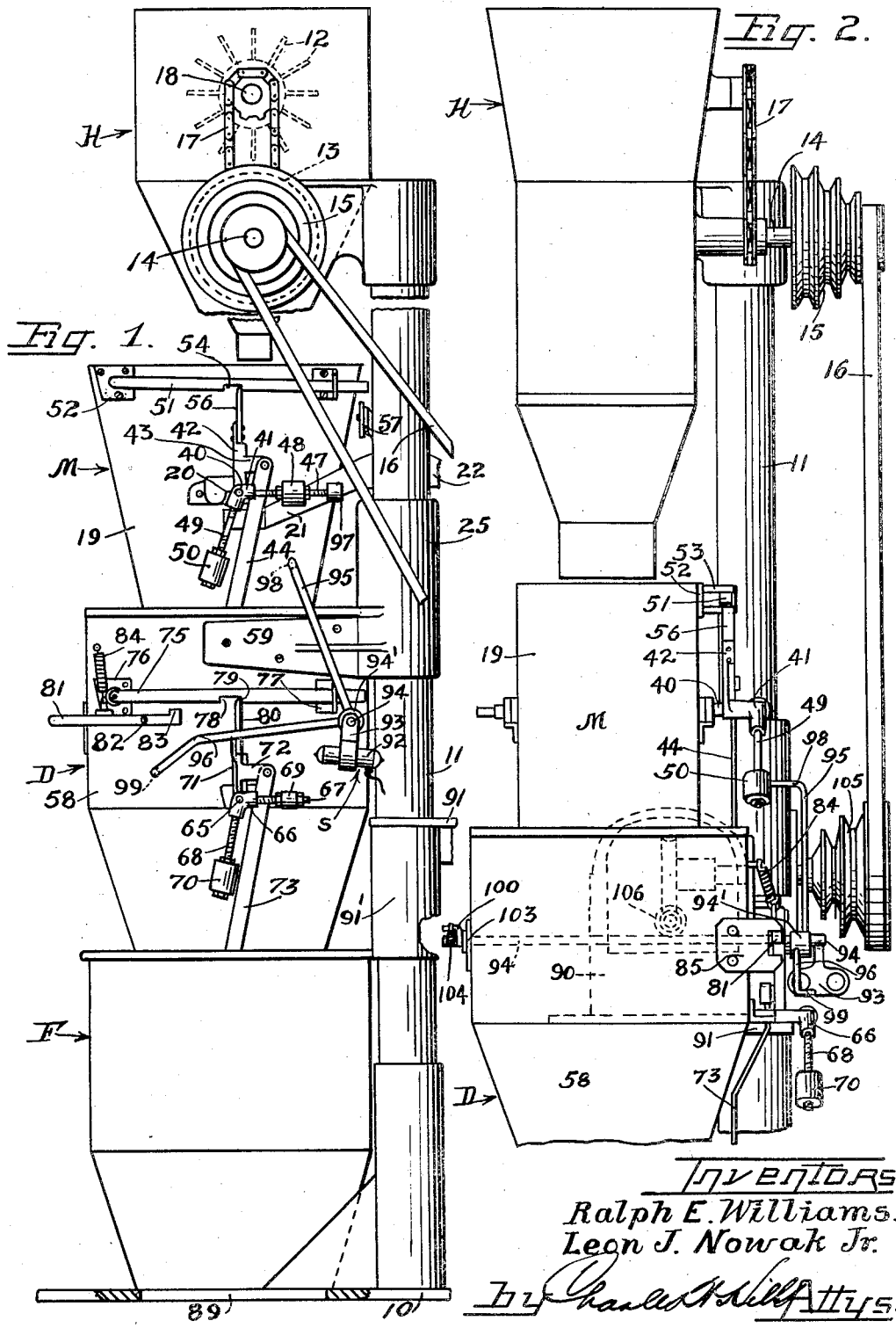

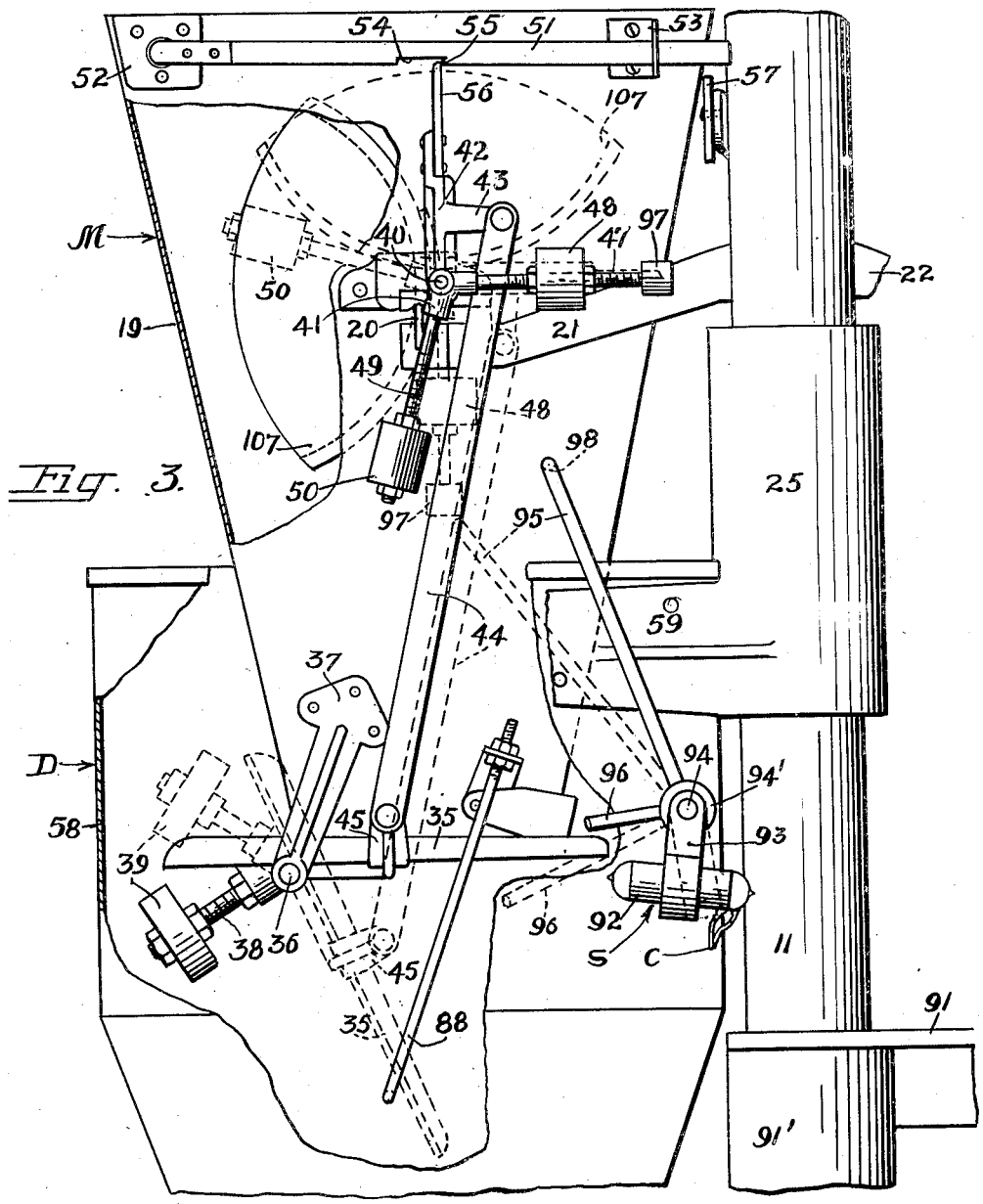

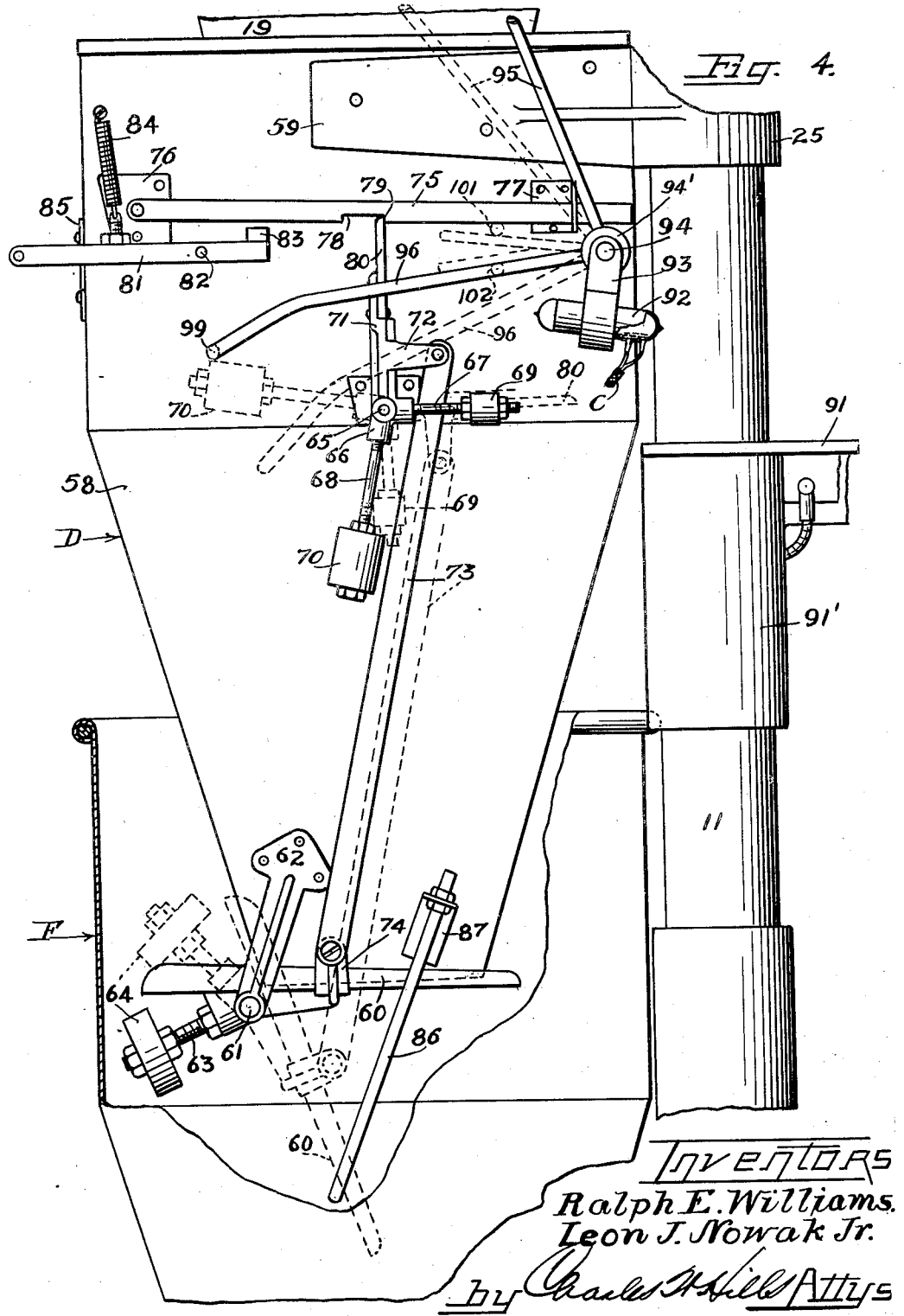

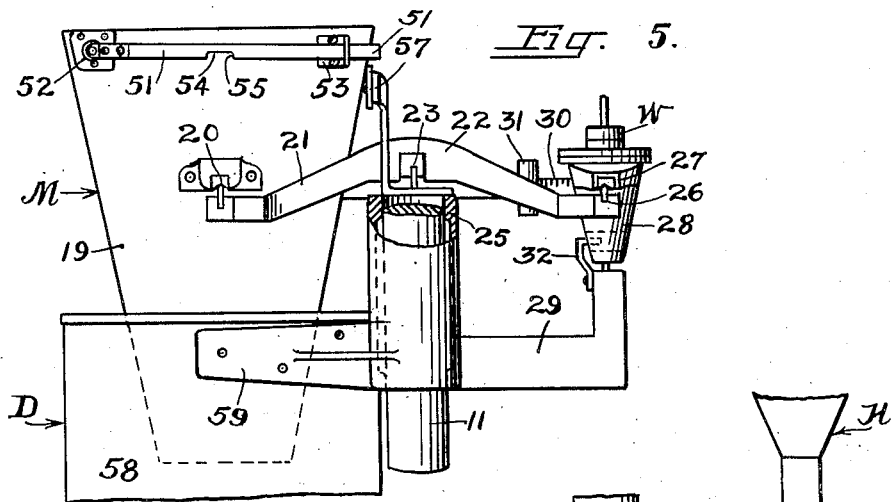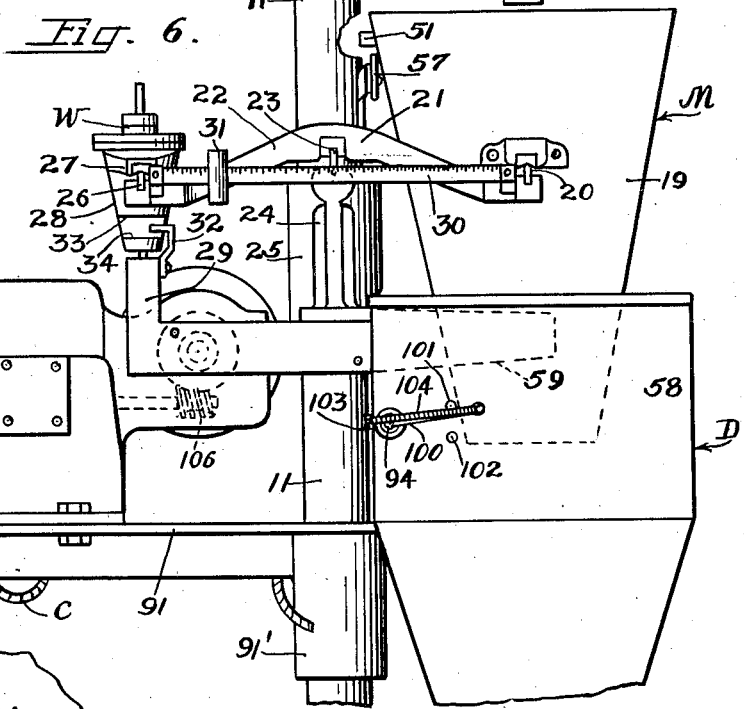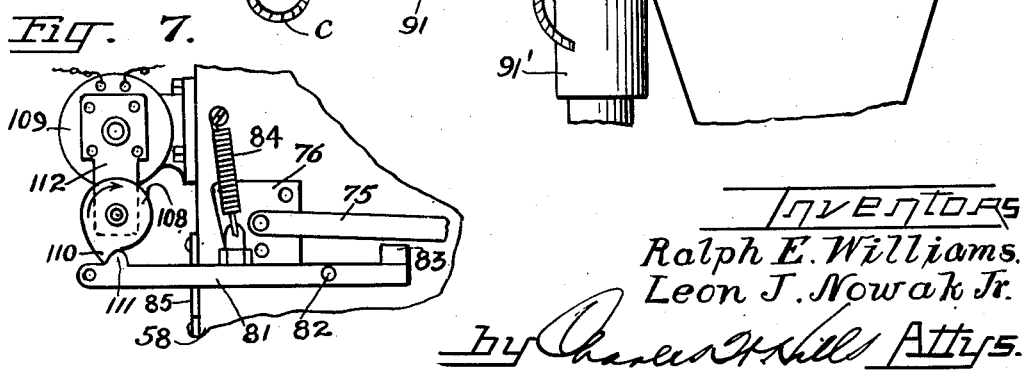

2,406,934

UNITED STATES PATENT OFFICE 2,406,934

WEIGHING AND DISPENSING APPARATUS

Ralph E. Williams, River Forest, and Leon J. Nowak, Jr., Chicago, Ill., assignors to B. F. Gump Co., Chicago, Ill., a corporation of Illinois Application January 10, 1944, Serial No. 517,642

11 Claims. (Cl. 249—38)

Our invention relates to weighing and dispensing apparatus adapted particularly for weighing and dispensing commodities such as food products in granular or comminuted form as for example, cereals, powdered vegetables, or other products in the form of small pieces or units which will flow.

An important object of the invention is to produce an apparatus of this type in which a feed regulator feeds the material to a scale supported weighing bin which is automatically controlled, as soon as it has received a predetermined weight of the material, for discharging the material into a dispensing bin from which the weighed quantities of the material are discharged into receivers.

A further object is to provide weighing and dispensing apparatus in which the discharging operation of the weighing bin into the dispensing bin stops further flow from the feed regulator into the weighing bin until the weighed contents received in the dispensing bin are discharged therefrom, and with the discharging operation from the dispensing bin automatically causing resumption of feeding into the weighing bin from the feed regulator.

A further object is to provide an arrangement in which the feed regulator is operated from a driving source provided with controlling means which is actuated by the discharging operation of the weighing bin to stop operation of the driving source and flow from the feed regulator, and which control means is actuated by the discharging movement of the dispensing bin to reset the driving source for resumption of feed into the weighing bin.

Still another object is to provide for synchronizing the operation of the weighing structure with the discharging from the dispensing structure in order that the weighing structure, after discharge therefrom of a weighed quantity of material, cannot be refilled from the feed regulator until the discharging mechanism for the dispensing structure is operated.

The above enumerated and other features of our invention are embodied on the structure shown on the drawings in which:

Figure 1 is a front elevation of the apparatus;

Figure 2 is a side elevation looking from the left of Figure 1;

Figure 3 is an enlarged front elevation, partly broken away, to show more clearly the linkage and operating means on the weighing bin structure;

Figure 4 is an enlarged front elevation to show more clearly the linkage and operating structure on the dispensing bin structure;

Figure 5 is a front elevation of the weighing bin structure showing its mounting on the scale means;

Figure 6 is a rear elevation to show more clearly the scale bar and the support thereon of the weighing bin structure and the scale weight structure; and Figure 7 shows an arrangement for timed power control of the discharging from the dispensing bin.

The various parts of the apparatus are supported on a base 10 and a column 11 secured to and extending up from the base. Mounted at the top of the column is the feed regulator H which may be of the type shown in Edtbauer Patent 1,330,179, of February 10, 1920, comprising the agitating element 12 and the feed drum 13, the feed drum shaft 14 mounting a pulley 15 for engagement by a drive belt 16, and the stirring element being driven by a chain belt 17 between the drum shaft and the shaft 18 of the stirring element.

The weighing bin structure M is located below the feed regulator to receive material therefrom. This weighing structure and its support and operation is similar to that disclosed in Edtbauer Patent 1,306,052 of June 10, 1919. It comprises the weighing bin 19 suspended by trunnion connections at the ends of the arms 21 of a scale beam 22 which intermediate its ends has fulcrum engagement with a post 24 extending upwardly from a sleeve 25 mounted on the column 11. The scale beam at its end opposite to the end on which the bin 19 is suspended has knife-edge trunnions 26 engaging the lugs 27 extending from the opposite sides of a weight support 28 guided for vertical movement from the end of a bracket 29 extending from the sleeve 25, the support 28 serving to receive scale weights W. Secured to and extending between the ends of the scale beam 21 is a calibrated scale bar 30 along which the poise weight 31 is slidable. To set the apparatus for service the weight of the bin structure M is first balanced by application of weights to the support 28 and setting of the weight 31 on the scale bar. Then additional weight is applied on the support 28 to correspond with the predetermined weight of a charge of material into the bin 19. A stop arm 32 extending from the bracket 29 is interposed between upper and lower shoulders 33 and 34 on the support 28 to limit the rocking movement of the scale beam 21.

A discharge door 35 normally closes the outlet end of the bin 19, the door being supported on a shaft 36 journaled in bearing brackets 37 secured to the opposite sides of the bin 19, a weight or arm 38 extending from the door and supporting a weight 39 which tends to keep the door swung to its closed position as shown on Figure 3. Near the upper end of the bin 19 a shaft 40 extends therethrough, a hub 41 being secured to one end of the shaft outside of the bin. Extending upwardly from the hub 41 is an arm 42 having the laterally extending lever arm 43 to the outer end of which a link 44 is pivoted at its upper end, the link at its lower end being pivoted to a fitting 45 secured to the door 35 at a point between the shaft 36 and the free end of the door, so that, upon opening swing of the door, the hub 41 will be rotated, this rotation being in clockwise direction (Figures 1 and 3).

Extending laterally from the hub 41, to the right is a bar 47 threaded to receive a weight 48, and extending downwardly from the hub 41 is another bar 49 threaded to receive a weight 50. Extending across the side of the bin 19 above the arm 42 on the hub 41 is the latch bar 51, this latch bar being fulcrumed at its left end, on a bracket 52 secured to the bin, the other end of the bar extending through a guide bracket 53 secured to the bin. Intermediate its ends the latch bar has the recess 54 providing the shoulder or abutment edge 55. A latch finger 56 extends upwardly from the arm 42 into the recess 54 when the door 35 of the bin 19 is closed, the abutment edge 55 being then engaged by the finger 56 so as to hold the hub 41 against rotation and through the link connection 44 to hold the discharge door 35 closed. Figures 1 and 3 show the latch bar down and the discharge door closed. When material is received in the bin from the feed structure H the weight of the material will be exerted against the discharge door tending to open it, but such opening is prevented by the latch bar until after the predetermined weight of material has been received in the bin 19 and then, as the loaded bin moves downwardly to swing the scale beam into balanced position, the end of the latch bar 51 will encounter the stationary abutment 57 so that upon further downward movement of the bin structure the latch finger 56 will be withdrawn from the latch bar edge 55, the force of the weight 48 and the weight of the material on the door then overcoming the door weight 39 and the weight 50 so that the discharge door is opened for discharge of the bin contents. The door opening movement and the corresponding positions assumed by the weights and the link 44 is shown by dotted lines on Figure 3. As soon as the material has been discharged from the bin 19 the weights 39 and 50 will be effective for reclosing of the door and rotation of the hub 41 and the link 44 into normal position. Also when the material is being discharged from the bin the weight W on the scale beam will swing the beam for upward movement of the unloaded bin and movement of the end of the latch bar 51 away from the abutment 57 for down swing of the latch bar to return its latching edge 55 into engagement with the latch finger 56, and the linkage between the latch bar and the door will hold the door closed.

Below the weighing bin structure M is the dispensing bin structure D. This dispensing bin structure comprises the bin 58 stationarily secured to a supporting arm 59 extending from the sleeve 25 mounted on the column 11. The bin has the discharge door 60 which is controlled in a manner similar to that of the discharge door of the weighing bin. The door is mounted on a shaft 61 journaled in brackets 62 on the bin, the bar 63 extending from the door supporting a weight 64. Above the door a shaft 65 is journaled on the bin and carries the hub 66 from which extend the bars 67 and 68 for weights 69 and 70 respectively. An arm 71 extends upwardly from the hub 66 and has the laterally extending lever arm 72 connected by the link 73 with the fitting 74 on the door. Above the arm 71 a latch bar 75 extends across the side of the bin and is fulcrumed at its outer end on the bracket 76, the other end of the bar extending through a guide bracket 77. Intermediate its ends the latch bar has the recess 78 providing the latch edge 79, a latch finger 80 extending upwardly from the arm 71 normally projecting into the recess to be engaged by the latching edge 79, this being the position when the discharge door 60 is closed. When there is no material in the bin 58, the door weight 64 will tend to hold the door closed and through the link connection 73 to hold the latch finger 80 for engagement by the latch bar. When a weighed charge of material is received in the bin 58 from the weighing bin 19, the weight of the material will tend to open the door 60 of the dispensing bin but the latch mechanism will prevent such opening. Means are provided for manually releasing the latch bar 75 from the latch finger, such means comprising a lever 81 fulcrumed at an intermediate point on a stud 82 extending from the bin, the inner end of the lever having the abutment 83 thereon below the latch bar 75. A spring 84 is connected with the outer end of the lever and tends to hold it in normal position against a stop plate 85 secured to the side of the bin 58. Upon downward swing of the outer end of the lever 81 the abutment 83 will engage with and raise the latch bar 75 for withdrawal of its latching edge 79 from the latching finger 80, and then the weight of the material on the discharge door 60 will overcome the door weight 64 and the weight 70 and the door will open for discharge of the material. After such discharge the weights 64 and 70 will return the door to its closed position and bring the latch finger 80 back into the recess 78 of the latch lever for engagement by the latching edge 79 so that the door is positively relocked in its closed position until the release lever 81 is again operated after the bin 80 has received another charge of material. An abutment stirrup 86 extended from brackets 87 on the bin 58 serves to limit the opening movement of the door 60, and a similar abutment stirrup 88 may be provided for the door 35 of the weighing bin 19.

Below the dispensing bin structure is a funnel structure F which is mounted on the base 10 with its outlet end in registration with the passageway 89 through the base. The charges of material from the dispensing bin 58 may be delivered by the funnel structure to a conveyor (not shown), or into containers carried by the conveyor. In some cases the material would be dispensed from the funnel into mixers, or into a press for compression of the material into more compact form before packaging thereof.

It is very desirable, that, while the dispensing bin 58 is discharging feeding of material from the feed regulator H into the weighing bin be automatically stopped in order to allow for proper disposal of the discharge from the dispensing bin before this bin receives another charge from the weighing bin. In other words it is very desirable that the discharging operation of the dispensing bin should automatically control the operation of the feed regulator and the operation of the weighing bin structure. The feed regulator is shown driven through the belt 16 by an electric motor 90 mounted on a bracket 91 extending from the sleeve 91' secured to the column 11. As shown, a switch S in the form of a mercury bulb, is included in the current supply circuit C for the motor, this switch being sequentially controlled by the opening movement of the discharge doors 35 and 60 for the weighing bin and dispensing bin respectively. The switch bulb 92 is secured in a frame 93 depending from a shaft 94 extending through the bin 58 at the inner side thereof. A setting arm 95 extends upwardly from a hub 94' on the shaft 94 and another setting arm 96 extends laterally from the hub. The arm 95 extends diagonally upwardly alongside of the bin 19 in the path of an abutment 97 on the end of the weight bar 47 extending from the hub 41, the end portion 98 of the arm 95 being deflected into the path of the abutment 97. The deflected end portion 99 of the arm 96 is in the path of the weight 70 on the bar 68 extending from the hub 66 on the shaft 65 on the dispensing bin 58. On Figures 1 and 3 the switch frame 93 with the arms 95 and 96 thereon has been rotated in clockwise direction for closing of the motor circuit by the switch bulb S for operation of the motor to drive the feed regulator for flow therefrom into the bin 19, the doors of both the bins being closed. Now, when the weighing bin has received a charge of material of predetermined weight and the bin moves down, the latch bar 51 is released for opening of the bin door 35 and clockwise rotation of the hub 41, and the abutment 97 will engage the switch arm 98 to rotate the switch in counter-clockwise direction for setting of the switch bulb for opening of the motor circuit and therefore stoppage of feed from the feed regulator. After discharge from the bin 19 into the bin 58 the door 35 of the bin 19 recloses but the bin 19 receives no material so long as the discharge door 60 of the dispensing bin 58 remains closed. However, as soon as the lever 81 is manually operated for unlatching of the latch bar 75, the discharge door 60 will be opened and by the resulting rotation of the shaft 55 the weight 70 will be carried up into engagement with the end 99 of the setting arm 96 of the switch and the switch will be rotated back in clockwise direction for reclosure of the motor circuit and resumption of feed from the feed regulator. Thus, discharge from the weighing bin will automatically result in stoppage of flow from the feed regulator and there will be no resumption of flow until the operator unlatches the dispensing bin discharge door 60 for setting of the switch for reclosure of the motor circuit. It will therefore be impossible for delivery of more than one weighed charge from the weighing bin into the dispensing bin before the dispensing bin is unloaded, and the operator will have plenty of time to handle the packaging before he unlatches the discharge door 60 for discharge from the dispensing bin.

Referring to Figures 2 and 6, the shaft 94, which supports the switch structure at its one end, terminates outside of the opposite side of the bin 58 and there has an arm 100 extending therefrom between upper and lower stops 101 and 102 extending from the bin wall, these stops limiting the rotational movement of the switch structure. Adjacent to the shaft end of the arm 100, a bracket 103 extends from the bin wall and from this bracket a cross center tension spring 104 extends to the outer end of the arm 100 so that, when the switch mechanism has been swung to its respective positions against the stops 101 and 102 for opening or closing of the motor circuit, such setting will be maintained by the spring 104.

The drive pulley 105 for the belt 16 is shown as driven by the motor 90 through a reduction gearing 106. When the motor circuit is opened, the motor may coast and stop. Some material may trickle down through the feed regulator but to intercept such trickling, the intercepting pan 107 is provided in the weighing bin 19. This pan is secured to the shaft 40, and when the discharge door for the bin 19 is closed and the feed regulator is operated, the pan will be in the vertical position but when the discharge door opens for discharging from the bin 19 the rotation of the shaft 40 by the link 44 will swing the pan to horizontal position below the end of the feed regulator to catch any drippings. Then, when the discharge door is again closed, the pan is returned to its vertical position to dump its contents into the bin. This intercepting pan thus prevents any material from flowing into the bin in addition to the weighed charge of material therein which is to be delivered to the dispensing bin 58.

Instead of manually operating the latching mechanism for the dispensing element D, means may be provided for automatically unlatching the latching mechanism at predetermined intervals. Referring to Figure 7, a cam 108 is driven by a synchronous motor 109 which may be mounted on the dispenser bin 58 above the end of lever 81. The cam has one or more raised portions 110 for engaging the abutment 111 on the lever to rock the lever for release of the latch bar 75. The cam is driven through suitable reduction gearing within the housing 112 so that the cam will operate the lever 81 at predetermined intervals.

We have thus produced an efficient apparatus in which the weighing in the weighing field and discharge of weighed charges into the dispensing field is automatically synchronized with the discharge from the dispensing field, so that it will be impossible to discharge from the weighing field until after discharge from the dispensing field.

It will, of course, be understood that various details of construction may be varied through a wide range without departing from the principles of this invention and it is therefore not the purpose to limit the patent granted hereon otherwise than necessitated by the scope of the appended claims.

We claim as our invention:

1. A unitary weighing and dispensing apparatus comprising a feed structure for material to be dispensed, a scale means, a weighing bin on said scale means for receiving material from said feed structure, a discharge door for said weighing bin and latching mechanism for normally holding it close, a dispensing bin below said weighing bin, a discharge door for said dispensing bin and latching mechanism for normally holding it closed, outflow control means for said feed structure normally effective for flow of material therefrom into said weighing bin, setting means for said flow controlling means, means effective upon downward movement of said weighing bin when loaded for releasing its door latching mechanism for opening of the door for discharge of the bin contents into said dispensing bin, means operated by the opening movement of the discharge door of said weighing bin for setting said setting means to cause said flow controlling means to stop flow from said feed structure, and means operated by the opening of the discharge door of said dispensing bin upon release of its latching mechanism for setting said setting mechanism to cause said flow controlling means to permit flow from said feed structure.

2. A unitary weighing and dispensing apparatus comprising a feed structure, a weighing bin for receiving material from said feed structure, a scale beam on which said weighing bin is mounted for vertical movement, a stationary dispensing bin for receiving the weighed contents of said weighing bin, a discharge door for said weighing bin and latch mechanism normally holding in closed, a discharge door for said dispensing bin and latch mechanism normally holding it closed, an electric driving motor for said feed structure and a circuit therefor, switch means controlling said circuit, said circuit being closed for running of said motor for feeding of material into said weighing bin, means effective during downward movement of said weighing bin after having received a predetermined amount of material for releasing the latching mechanism for opening of the discharge door of said bin for discharge of the material into said dispensing bin, means controlled by the opening of the discharge door of said weighing bin for setting said switch means for opening of the motor circuit whereby further feeding from said feed structure will be stopped, and means effective by the opening movement of the dispensing bin discharge door after release thereof from its latching mechanism for setting said switch means for reclosure of the motor circuit and operation of said feed structure to feed another charge of material into said weighing bin.

3. A unitary weighing and dispensing apparatus comprising a feed structure, a weighing bin for receiving material from said feed structure, a scale beam supporting said weighing bin, a discharge door for said weighing bin and means normally holding it closed, a dispensing bin for receiving the weighed material from the weighing bin, a discharge door for said dispensing bin and means normally holding it closed, an electric driving motor for said feed structure and a circuit therefor, switch means controlling said circuit, said switch normally holding said circuit closed for operation of said feed structure by said motor, means for releasing the door of said weighing bin for opening only after said bin has received a predetermined weight of material from said feed structure, means controlled by the opening of the discharge door of said weighing bin for setting said switch means for opening of said circuit and stoppage of flow from said feed structure, and means effective upon opening of the discharge door of said dispensing bin for resetting said switch for reclosure of said circuit and feed operation of said feed structure by said motor.

4. A unitary weighing and dispensing apparatus comprising a feed structure for material to be weighed and dispensed, a scale supported weighing bin for receiving material from said feed structure and having a normally closed discharge outlet, a dispensing bin for receiving weighed quantities of material from said weighing bin and having a normally closed discharge outlet, means automatically controlled by the opening of the weighing bin discharge outlet for controlling said feed structure to prevent further flow therefrom until said dispensing bin discharge outlet is opened, and means automatically controlled by the opening of the dispensing bin discharge outlet for controlling said feed structure for resumption of flow therefrom.

5. A weighing and dispensing apparatus comprising a feed structure for material to be weighed and dispensed, a scale supported weighing bin below said feed structure having a normally closed discharge outlet, a dispensing bin below said weighing bin for receiving weighed quantities of material from the weighing bin and having a normally closed discharge outlet, driving means for said feed structure, control means for said driving means, means effective upon opening of the weighing bin discharge outlet to set said control means to prevent operation of said feed structure by said driving means, and means effective only upon opening of said dispensing bin discharge outlet after closure of said weighing bin discharge outlet for setting said control means for operation of said drive means and resumption of flow from said feed structure.

6. In apparatus of the type disclosed, a feed regulator and a power drive therefor, a scale supported weighing bin for receiving material from said feed regulator and having normally closed discharge means, a control for said power drive normally set for functioning of the power drive for feed of material into said bin, means for automatically effecting opening of said discharge means for discharge from said bin after it has received a predetermined weight of material, means automatically controlled by the opening movement of said discharge means for setting said control to prevent functioning of said power drive, a dispensing bin below said weighing bin having normally closed discharge means, and means automatically controlled by the opening movement of the discharge means of said dispensing bin for setting said control for functioning of said power drive and resumption of feed to said weighing bin from said feed regulator.

7. A weighing and dispensing apparatus comprising a feed structure for material to be weighed and dispensed, a scale supported weighing bin below said feed structure having a normally closed discharge outlet, a dispensing bin below said weighing bin for receiving weighed quantities of material from the weighing bin and having a normally closed discharge outlet, time controlled means for automatically controlling the opening of the discharge outlet at said dispensing bin at predetermined time intervals, control means for said feed structure, means whereby opening of the weighing bin discharge outlet will operate said control means to prevent further flow from said feed structure, and means whereby upon opening of said dispensing discharge outlet after closure of said weighing bin discharge outlet said control means will be operated for flow from said feed structure.

8. A unitary weighing and dispensing apparatus comprising a feed structure for material to be weighed and dispensed, a weighing bin below said feed structure having a discharge outlet and closure structure normally closing said outlet, a dispensing bin below said weighing bin having a discharge outlet and closure structure normally closing said outlet, driving means for said feed structure, a control for said driving means disposed to be engaged by said closure structures in such manner that, when the weighing bin closure structure is opened for discharge into the dispensing bin, said control will be set by said closure structure for control of the driving means to stop further drive of said feed structure and when said dispensing bin closure structure is opened after closure of the weighing bin closure structure, said control will be set for resumption of drive of said feed structure.

9. A unitary weighing and dispensing apparatus comprising a feed structure, a driving motor for said feed structure for controlling the flow therefrom, a weighing bin below said feed structure having a discharge outlet and a closure member normally closing said outlet, a dispensing bin below said weighing bin having a discharge outlet and a closure member normally closing said outlet, a control switch for the motor, means operated by the opening movement of said weighing bin closure member for setting said switch for control of the motor for stoppage of the motor and stoppage of flow from the feed structure, and means operated when said dispensing bin closure member is opened for setting said switch for control of said motor for operation of the motor for flow from said feed structure.

10. A unitary weighing and dispensing apparatus comprising a feed structure for material to be weighed and dispensed, a weighing bin below said feed structure having a discharge outlet and closure structure normally closing said outlet, a dispensing bin below said weighing bin having a discharge outlet and closure structure normally closing said outlet, driving means for said feed structure, a control for said driving means disposed to be engaged by said closure structures in such manner that, when the weighing bin closure structure is opened for discharge into the dispensing bin, said control will be set by said closure structure for control of the driving means to stop further drive of said feed structure and when said dispensing bin closure structure is opened after closure of the weighing bin closure structure, said control will be set for resumption of drive of said feed structure, and time controlled means for automatically effecting opening of said dispensing bin closure structure only at predetermined time intervals.

11. In a dispensing and weighing apparatus, means for feeding material into a weighing area, means at said area for weighing the fed material, means for discharging a weighed quantity of material from said weighing means into a dispensing area, means at said dispensing area for dispensing said weighed quantity of material, means for arresting further feed of material into the weighing means until the weighed quantity of material has been fed into the dispensing means and means controlling the opening of said dispensing means for discharge of weighed material therefrom and for, coincidentally with said opening, effecting resumption of feed to the weighing means.

RALPH E. WILLIAMS.
LEON J. NOWAK, Jr.